United States Patent [19]

Fuerst

[11] 4,050,363
[45] Sept. 27, 1977

[54] AIR VENT COVER ASSEMBLY

[76] Inventor: Harry W. Fuerst, 1740 Albion, Los Angeles, Calif. 90031

[21] Appl. No.: 653,441

[22] Filed: Jan. 29, 1976

[51] Int. Cl.² .................................................. F24F 7/00
[52] U.S. Cl. ...................................... 98/37; 98/42 R; 98/64; 29/453; 285/290
[58] Field of Search .................. 98/37, 13, 64, 114, 98/42 A, 42 R; 312/1; 220/322; 29/453; 285/290

[56] References Cited

U.S. PATENT DOCUMENTS

| 3,013,483 | 12/1961 | Knight | 98/37 |
| 3,062,125 | 11/1962 | Henneberger | 98/37 |
| 3,112,687 | 12/1963 | Henneberger | 98/37 |
| 3,366,028 | 1/1968 | Beck | 98/64 |
| 3,524,400 | 8/1970 | Magi | 98/37 |
| 3,892,169 | 7/1975 | Jarnot | 98/37 |

Primary Examiner—William F. O'Dea
Assistant Examiner—Henry C. Yuen
Attorney, Agent, or Firm—Donald W. Canady

[57] ABSTRACT

This Application discloses an air vent cover assembly for a vent opening in an enclosed structure such as a boat cabin compartment. The assembly includes a connecting ring which is attached to the vent opening in the structure, and a detachable air scoop member having a snap ring which attaches onto an external groove on the upper portion of the connecting ring. The vent assembly is so arranged and constructed as to eliminate all fasteners on the outside of the vent cover or scoop.

3 Claims, 7 Drawing Figures

AIR VENT COVER ASSEMBLY

BACKGROUND OF THE INVENTION

Governmental regulations require venting of enclosed engine compartments in marine vessels. It is also desireable and necessary to vent other enclosed compartments of marine vessels and other structures. Such vents customarily comprise an opening in the compartment and a cover over the opening to prevent entry of water or solid material into the compartment through the vent opening. The cover for the vent opening is customarily shaped in the form of a scoop to direct air into or out of the structure through the opening. Normally vent scoops on the force section of the boat would be directed to facilitate entry of air and the vent scoops on the aft section of the boat would be directed to educt air from the enclosed compartment.

Where the compartment to be vented is not adjacent the vent openings, it is desireable for the vented compartment to be connected to the vent openings with a flexible air hose. Where the vent openings are in the compartment to be ventilated, but distant to the vent openings, such flexible air hoses are needed to provide adequate ventilation for such distant compartments.

DESCRIPTION OF THE PRIOR ART

In the prior art, vent covers for the vent openings were attached to the vent opening by external screws threaded into the structure. Removal of the air scoop or vent cover required that the screws be removed from the structure and hence when removed more than two or three times could not be re-attached to the structure in the same position with rebuilding or re-drilling the screw holes.

Other prior art vent covers were attached to the vent opening by threading into a ring which was screwed onto the structure at the vent opening. Removal of the air scoop from such prior art structure was time-consuming and sometimes difficult if the threads could not be readily broken. In addition, replaving the air scoop hastily sometimes resulted in stripping of the threads.

The means for fastening the scoop covers of the prior art to the structure presented an obstruction onto which tie ropes and other lines could snag or catch which is particularly troublesome on sailing vessels. The prior art external fastening means for the vent covers also made cleaning the outside surface of the structure, e.g. the boat deck, more difficult.

SUMMARY OF THE INVENTION

An object of my present invention is to provide a vent cover for a vent opening in a boat or other structure, which cover is fastened to the structure by means which do not present obstructions upon which tie-down ropes or sail ropes can snag.

It is also an object of my present invention to provide a vent opening cover for an enclosed structure which is readily removable and which may be turned about a vertical axis as required for maximizing the ventilation of the enclosed compartment.

It is a further object of my present invention to provide a vent opening cover which facilitates cleaning of the deck or structure in which the vent opening is made and which minimizes entry of water into the vent opening as the deck is washed down.

The foregoing object and other objections which will become apparent from the following description of my invention when taken in connection with the drawings, are realized in accordance with my present invention, by providing a connecting ring which is fitted into and fastened to the structure at the vent opening and providing an external groove adjacent the upper end of the connecting ring for connecting an air scoop which has a clamp ring therein for attachment to the groove of the connecting ring. The air scoop when mounted on the connecting ring, may be rotated about a vertical axis, 360 degrees, since the external groove in the connecting ring extends 360 degrees around the connecting ring. An internal lug is formed within the connecting ring for threadably holding wire enforced flexible air hose, which is conventionally used for ventilating compartments remote from the vent openings.

DESCRIPTION OF THE PREFERRED EMBODIMENT

Figure 1:
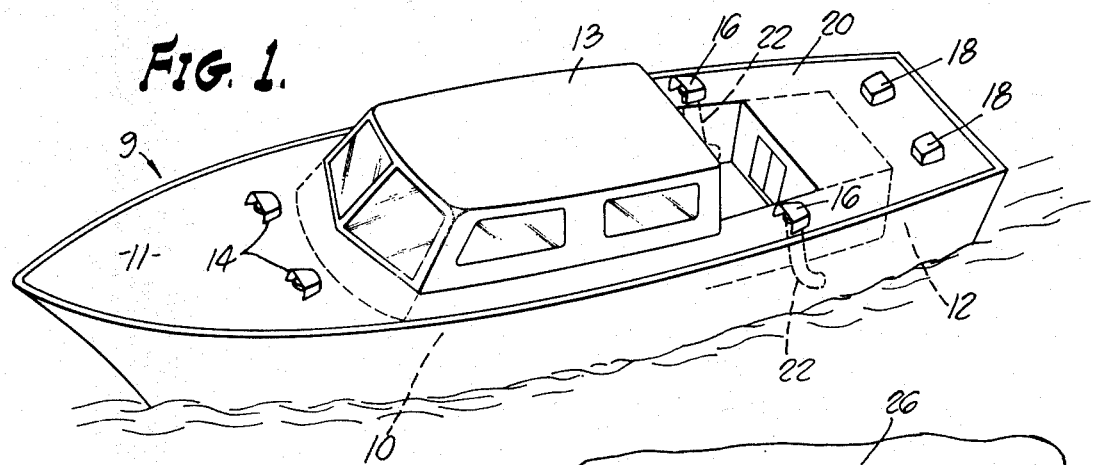
FIG. 1 shows a boat of the type with which the air vent covers of my present invention may be employed, with several of the vent covers operatively installed thereon.

With reference to the drawings, FIG. 1 shows a small, in-board pleasure boat 9 having a forward cabin section 10 and a bilge or engine compartment 12 in the aft section below the rear portion of the cabin section. Vents 14 are provided in the deck 11 above the cabin compartment of the boat. Vents 16 are provided on the deck just aft of the cabin roof 13 and directed as intake vents for the bilge or engine compartment 12, and vents 18 are provided near the rear of the deck as exhaust vents for the bilge or engine compartment of the boat. As shown in FIG. 1, the vents 16 which provide ventilation for the bilge compartment 12 which is remote from the rear deck 20, require flexible vent hoses 22 to effect the passage of air from the vented compartment to the vent opening. These flexible hose sections are connected to the vent cover assembly as will be discussed hereinafter.

Figure 2:
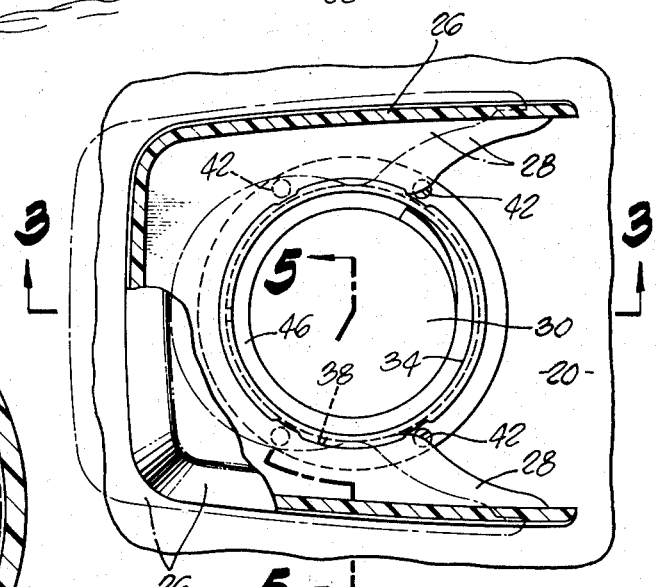
FIG. 2 shows an enlarged view of an air vent cover, partially in section as mounted aft on the boat shown in FIG. 1.

FIG. 2 is an enlarged view of the vent cover assembly, e.g. 18, showing the scoop or vent portion 26 and the snap ring 28 which are attached or formed together as shown in 3 and will be described hereinafter. The vent opening 30 in the deck 20 of the boat 10 is provided with a connecting ring 34 as best viewed in FIG. 3. The connecting ring 34 is attached to the vent opening 30 in the deck 20 with screws 42. The connecting ring could also be fastened to the vent opening by a push-type friction seal, bayonet-type connection, or any conventional connecting means.

With the connecting ring 34 fastened into the deck opening 30, the vent cover or scoop 26 may be attached at the vent opening by forcing the snap ring open sufficiently to move in the groove 38 around the connecting ring and firmly engage the connecting ring 38 near the upper end thereof. The manner of attachment of the snap ring onto the connecting ring is shown in phantom line in FIG. 2. In the phantom line position, the snap ring is shown forced open to go around the maximum width of the external ring and then when the snap ring is pushed onto the connecting ring to the position shown in solid line, the snap ring and hence the cover are secured to the connecting ring. Since the groove 38 extends circumferentially around the connecting ring, the vent or scoop 26 with the snap ring may be rotated about the vertical axis of the vent opening the permit 360 degree rotation of the vent or scoop cover 26.

Figure 4:
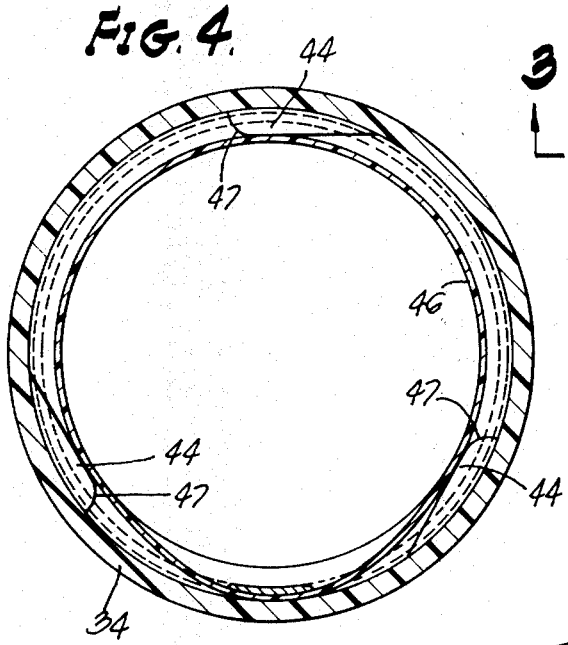
FIG. 4 is a sectional view taken on line 4 — 4 of FIG. 3 and showing the manner in which a ventilating hose is threadably attached to the vent opening within the connecting ring.
Figure 3:
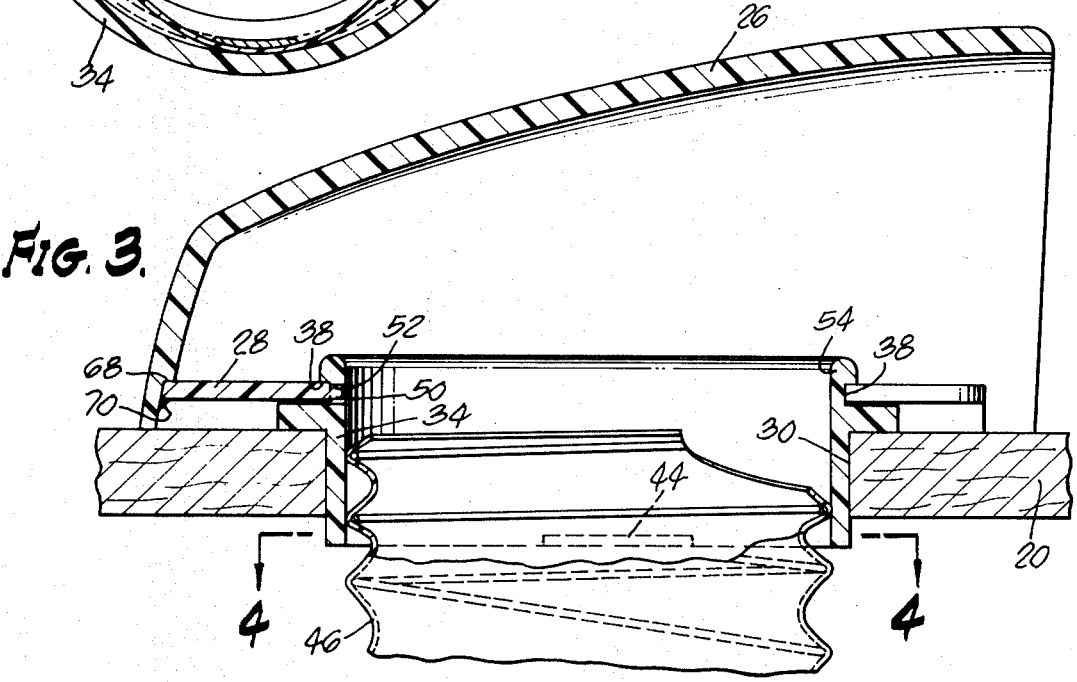
FIG. 3 is a further enlarged cross-sectional view of a section taken on line 3 — 3 of FIG. 2 and showing the manner in which the vent cover is affixed at the vent opening on a connecting ring.

A plurality of circumferentially spaced elongated lugs 44 are provided within the lower inner surface of the connecting ring 34 as best shown in FIGS. 3 and 4. The flexible hose 46 which is a conventional wire reinforced flexible vinyl air hose, may be threadably connected to the connecting rings by engagement of the reinforcement wire with with the lugs. The lugs 44 are elongated as shown in FIG. 4 to provide additional bearing surface for attachment to the connecting rings, and rounded at the forward edge 46 to prevent tearing of the vinyl hose material.

Figure 5:
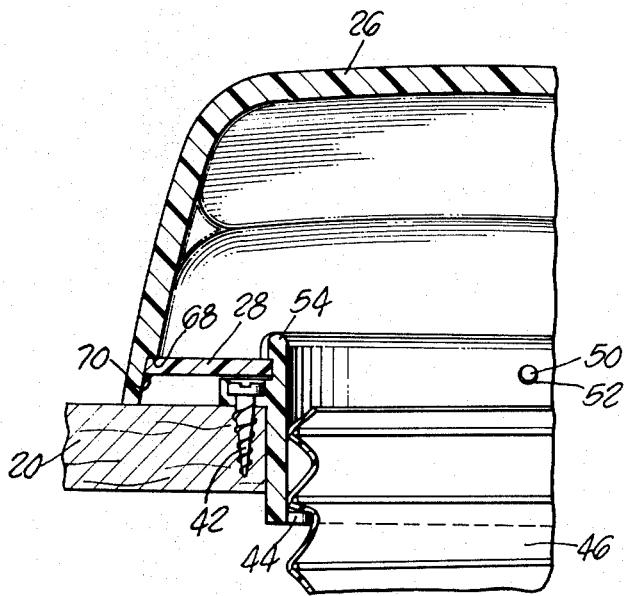
FIG. 5 is a sectional view taken on line 5 — 5 of FIG. 2 showing the inner rear portion of the vent with an orientation positioning means.
Figure 7:
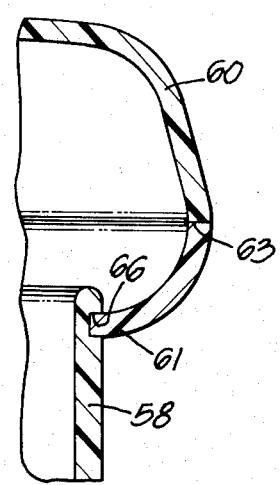
FIG. 7 is a cross-sectional end view of a position of the air scoop shown in FIG. 6.

FIG. 5 shows a view of the vent cover assembly looking through the scoop and showing a lug 50 which is formed on the inner edge of the snap ring 28 and which protrudes through window 52 which is cut through the connecting ring in the area of the groove 38, as best shown in FIG. 3. This orientation lug 50 is provided to comply with governmental regulations which require that the scoop face in a particular direction and be non-rotational. When it is desired to use the vent cover assembly in an application where rotation of the scoop is permitted, the lug 50 can be removed by shearing or cutting.

Figure 6:
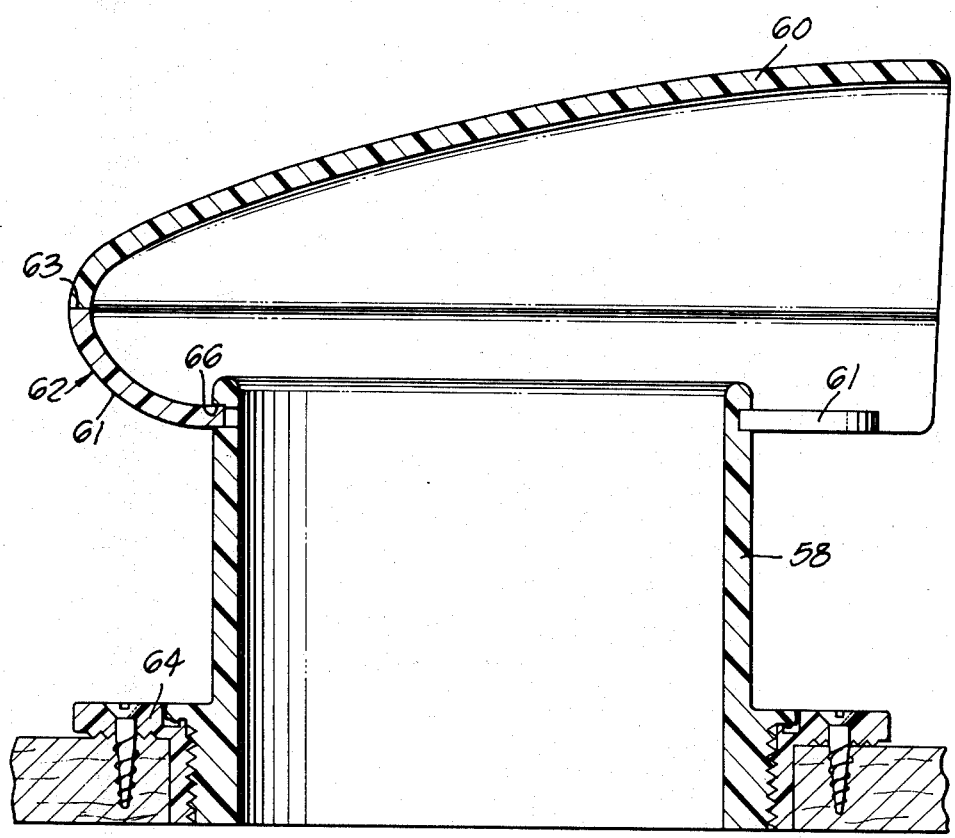
FIG. 6 is a cross-sectional enlarged view of a modified form of the present invention with a modified air scoop and an extended connecting ring threadably attachable to the structure.

The upper end 54 of the connecting ring protrudes upwardly above the upper surface of the deck 20 so that wash water on the deck does not readily pass into the vent opening. As shown in FIG. 6, the neck 58 of the connecting ring may be extended upwardly and such an arrangement not only aids in the prevention of water entry into the vent opening (and hence into the ventilated compartment) but also positions the scoop 60 in an improved position for ventilation in certain applications. The scoop 60 as shown in FIG. 6 is a modified form of the scoop which is curved at 62 to minimize snagging of ropes and tie-lines. The snap ring 61 for this embodiment is formed or molded to conform to the shape of the scoop 60 and bonded thereto at 63.

FIG. 6 also shows a modification of the connecting ring wherein a base ring 64 is threaded into the deck opening and a connecting ring 58 is threaded into the base ring 64. The scoop 60 is removable and rotatably attached into the connecting ring at external groove 66. This modification provides the additional advantage of interchangeability of connecting rings by simply threadably removing ring 58 and replacing it with a different ring.

The scoop members 26 and 60 used with my present invention are preferably of a soft flexible vinyl plastic material although they may be rigid vinyl plastic or a metallic material. The snap ring 34 is preferably made of a rigid vinyl plastic material, in order to provide the flexibility needed to clamp the snap ring onto the connecting ring groove.

For convenience of manufacture, the vent or scoop 26 is formed with a shelf 68 around the lower portion thereof onto which the snap ring 28 may be seated for attachment. The snap ring 28 and the scoop 26 are both preferably made from a similar vinyl material so that a solvent type cement can be used which bonds the two materials into one piece. Such a solvent cement may be applied with a needle and capillary action moves the cement into the crack around the ledge or shelf 68. In order to insure a good bond, a bead 70 of heavier type cement may then be placed around the outer edge of the snap ring.

The connecting ring 34 may be an injection molded ring with the groove 38 formed in the mold or the groove 38 may be fashioned with the router on a shaper table. The scoop or vent portions 26 and 60 may also be formed by injection molding.

While my present invention has been described in reference to the above drawings with respect to certain specific embodiments with a certain degree of particularity, it is to be understood that my invention is not limited to the details set forth herein but should be afforded the full scope of the appended claims.

I claim as my invention:

1. A detachable deck vent assembly comprising:
   a connecting ring positionable in a vent opening of a deck;
   means for affixing said connecting ring to said deck;
   said connecting ring having a groove therein positioned external to said deck and an opening through said ring within said groove;
   a scoop member for said vent opening releasably connected to said deck by attachment to said connecting ring groove, through a snap ring affixed to said scoop member and adapted for clamping engagement with said connecting ring groove to attach said scoop member to said connecting ring, and said snap ring having an orientation lug formed on the inner edge thereof and adapted to engage said groove opening to prevent rotation of said scoop member about said connecting ring.

2. The apparatus of claim 1 wherein said scoop member is provided with a shelf for aligning said snap ring relative to said scoop member prior to bonding said snap ring to said scoop member.

3. The apparatus of claim 1 wherein said connecting ring comprises a first member positionable in said deck vent opening and a second member threadably engageable with said first member and having said groove therein for attachment of said scoop member to said second member.

* * * * *